US 8,475,583 B2

Jul. 2, 2013

(54) DRY AMORPHOUS SILICA PRODUCT WITH INERT CARRIER

(75) Inventor: Joseph D. Russo, Palo Alto, CA (US)

(73) Assignee: Rousseau Research, Inc., Palo Alto, CA (US)

( * ) Notice: Subject to any disclaimer, the term of this patent is extended or adjusted under 35 U.S.C. 154(b) by 0 days.

(21) Appl. No.: 13/080,595

(22) Filed: Apr. 5, 2011

(65) Prior Publication Data

US 2011/0212830 A1 Sep. 1, 2011

Related U.S. Application Data

(62) Division of application No. 12/035,362, filed on Feb. 21, 2008, now Pat. No. 7,922,913.

(51) Int. Cl.
*C04B 14/04* (2006.01)

(52) U.S. Cl.
USPC .................................................. 106/481

(58) Field of Classification Search
USPC .................................................. 106/481
See application file for complete search history.

(56) References Cited

U.S. PATENT DOCUMENTS

| 4,670,156 | A | 6/1987 | Grenthe |
|---|---|---|---|
| 5,009,790 | A | 4/1991 | Bustamante et al. |
| 5,037,557 | A | 8/1991 | Warrenchak et al. |
| 5,114,593 | A | 5/1992 | Diaz |
| 5,135,578 | A | 8/1992 | Billings |
| 5,135,656 | A | 8/1992 | Means et al. |
| 5,244,503 | A | 9/1993 | Fabian |
| 5,723,424 | A | 3/1998 | Jennings |
| 5,795,842 | A | 8/1998 | Sundquist |
| 5,951,784 | A | 9/1999 | Hawes |
| 6,027,652 | A | 2/2000 | Hondroulis et al. |
| 6,260,511 | B1 | 7/2001 | Hsu |
| 6,391,120 | B1 | 5/2002 | Silva |
| 6,416,670 | B1 | 7/2002 | Cummings |
| 6,506,307 | B1 | 1/2003 | Hondroulis et al. |
| 6,827,792 | B2 | 12/2004 | Cervero et al. |
| 7,041,221 | B2 | 5/2006 | Arnott |
| 2005/0028839 | A1 | 2/2005 | MacQuoid |
| 2006/0276361 | A1 | 12/2006 | Bullis et al. |
| 2007/0125269 | A1* | 6/2007 | Nishi .............................. 106/481 |

FOREIGN PATENT DOCUMENTS

WO  WO 2007/104955 A1  9/2007

OTHER PUBLICATIONS

"Health Effects of Occupational Exposure to Respirable Crystalline Silica"; Niosh Hazard Review; Chapter 1, pp. 1-4.
W.R. Grace; "Participated Silica"; 2 pages.

* cited by examiner

*Primary Examiner* — Chester Barry
(74) *Attorney, Agent, or Firm* — Duane Morris LLP; Guy W. Chambers

(57) ABSTRACT

A dry product that permanently removes oil and oil stains from liquid or dry surfaces and is environmentally safe. The dry product is formed by mixing efficacious proportions of untreated amorphous silica with a dry, inert organic, inorganic or synthetic carrier, or combinations of said carriers. Suitable inert carriers include, but are not limited to, (a) inert inorganic carriers including, but not limited to, clays, perlite, vermiculite, crushed glass, volcanic ash and sand; (b) inert organic carriers, including, but not limited to, peat moss, straw, hay, sawdust, ground corncobs, flours, and coconut coir, and (c) inert synthetic carriers, including, but not limited to, polyurethane, polyethylene and polypropylene. The dry product can be applied directly to oil stains either on a hard surface, such as concrete or asphalt, or to oil spills on water.

8 Claims, No Drawings

DRY AMORPHOUS SILICA PRODUCT WITH INERT CARRIER

CROSS REFERENCE TO RELATED APPLICATIONS

This application is a divisional application of U.S. application Ser. No. 12/035,362, entitled "Dry Amorphous Silica Product With Inert Carrier To Remove Oil From Surfaces" filed Feb. 21, 2008 and now issued as U.S. Pat. No. 7,922,913, the disclosures of which are hereby expressly incorporated by reference for all purposes in its entirety.

FIELD OF THE INVENTION

The present invention relates to environmentally protective, self-acting oil absorbent products which can be applied to hard surfaces, such as concrete, asphalt, pavers, countertops and wood, as well as oil spills from water surfaces. The products have, as components, dry, synthetic amorphous silica combined with a dry, inert carrier. The inert carrier may be synthetic, organic, or inorganic or a combination of these carriers.

BACKGROUND OF THE INVENTION

Dry, granular adsorbent materials are used for a variety of industrial and household purposes, including oil absorption. Nonetheless, the absorption and removal of oil often creates environmental issues. In fact, many authorities have banned the flushing of environmentally hazardous oil residues into storm drain systems which flow into our natural ecosystems. Even when contaminated residues collected from and combined with cleaning materials are discarded into solid waste dump sites, they represent eco-hazards by having their soluble, ionizing contaminants as well as non-soluble, unbound oil and chemical contaminates bleed and leach into the soil and groundwater.

U.S. Published Patent Application No. US2006/0276361A1 refers to surface cleaning and contaminant absorption compositions. While these complex compositions appear friendlier to the environment than other compositions in the art, they contain Zeolite® (chemically known as potassium-calcium-sodium aluminosilicate), fly ash, carbonates, charcoal, and/or surfactants. The surfactants are described as an active agent to aid absorption, i.e., by increasing the wetting and emulsifying capacity of the compositions. The negative aspect of these surfactants is that they aid the contaminant to leach out when disposed of and thus is not eco-compatible. The concrete asphalt cleaning art described in this application also mentions a solvent, preferably diproplylene glycol monomethyl, to dissolve surface contaminants. These solvents also aid the bleeding/leaching of contaminants into the soils of the solid waste site and become contaminants themselves.

Other prior art cites various adsorbents, absorbents and cleaning materials. The disadvantage of these compositions is that they produce complex contaminated residues unsuitable for disposal in sanitary/storm drains.

For example, Cervero's U.S. Pat. No. 6,827,792 B2 discloses the creation of admixtures of inorganic salts with silica gel (amorphous silica) to absorb liquid wastes, oils and hydrocarbons. Similarly, WO/2007/104955 describes carpet cleaning compositions that contain at least 30% of precipitated or fumed silica component (also amorphous silica), with preferential amounts greater than 50% by weight, to which is added alkali metal salts and an active detergent. Dozens of types of detergents are listed including eco-harmful phosphates which are discouraged or banned in most states. The use of ionizing salts in these formulations causes high solubility and thereby detracts from the ability of the amorphous silica to absorb liquid wastes, oils and hydrocarbons. Moreover, the ionizing salts can cause any liquid wastes, oils and hydrocarbons absorbed by the amorphous silica to bleed and leach away when placed in waste dumps.

U.S. Pat. No. 5,951,784 teaches scrubbing with detergent, phosphates and other surfactants to clean oil off concrete followed by rinsing with water and subsequently, in a second application, introduction of a fine clay absorbent to remove the stain. This is onerous and results in unacceptable contaminated waste, unfit for disposal.

U.S. Pat. No. 5,723,424 pertains to a concrete cleaning mixture described as two components. The first component consists of a granular Oil-Dri® type absorbent attapulgite clay material combined with granular cat litter/attapulgite-type clay. This is rubbed onto the oil contamination and then removed. The second component consists of kaolin-type clay and finely ground clay dust that absorbs the oil from pores and crevices. Use of this product is laborious and produces unbound contaminated waste that easily allows oil to bleed/leach when disposed of in landfill.

U.S. Pat. No. 7,041,221 B2 uses crushed glass as an absorber of oil from surface water whereby the crushed glass sinks when it is coated with oil and is subsequently recovered, then recycled into roof shingles or asphalt. The disclosed recycling acknowledges the eco-threat of the contaminated absorbate, which cannot be discarded into solid waste dump sites because the oil will bleed into the soil since the oil is not permanently bound to the crushed glass. The same is true if this method had been used to remove oil from a solid surface.

U.S. Published Patent Application No. US2005/0028839 A1 teaches a method for treating spills on roadways by using biodegradable absorbent material consisting of peat moss and coconut coir to absorb and remove spills. U.S. Pat. No. 6,391,120 B1 describes use of coconut coir pith as sorbent. U.S. Pat. No. 4,670,156 discloses use of hydrophobic sorbent, particularly expanded reject fibers that absorb even heavy oils. U.S. Pat. No. 5,244,503 uses polyvinyl acetal to bind to absorbate and confirms "the adsorbent laden with absorbate should here arise in the most particulate or compacted form possible without adhering liquid oil residues, so that it can be collected mechanically and passed to disposal." All sorts of synthetics and other diverse oil sorbents such as polypropylene plastic foams, matting, and mixtures of fibers can absorb oil from water surfaces. They unfortunately all have the disadvantage of leaching liquid oil residues.

Numerous methods for removal of oil spills are well known and established in the art. The U.S. Environmental Protection Agency (EPA), for example, outlines response techniques at their website www.epa.gov/oilspill/oiltech.htm Use of natural and synthetic sorbent materials are described including advantages and disadvantages.

There is a great need for oil and oil stain removal that is done with materials that are totally compatible with the environment, easy to produce, easy to remove and, when discarded, does not bleed or leach back into the environment.

BRIEF SUMMARY OF THE INVENTION

The present invention provides for dry products that permanently remove oil, oil stains and/or hydrocarbons from liquid or dry surfaces and are environmentally safe. In the preferred embodiment, the dry products of the present invention are formed by mixing efficacious proportions of untreated amorphous silica with a dry, inert organic, inorganic or synthetic carrier, or combinations of said carriers. Suitable inert carriers include, but are not limited to, (a) inert natural, inorganic carriers including, but not limited to, clays (e.g., Kaolin type clay and Fuller's clay—Attasorb 30/60 RVM attapulgite, BASF Corp., Quincy, Fla.), perlite, vermiculite, crushed glass, volcanic ash and sand (RMC Pacific Materials, Pleasanton, Calif. kiln dried Monterey sand, 30 mesh "Lapis Lustre"); (b) inert organic carriers including, but not limited to, peat moss, straw, hay, sawdust, ground corncobs, flours, and coconut coir, and (c) inert synthetic carriers, including, but not limited to, polyurethane, polyethylene and polypropylene.

The dry products of the present invention can be applied directly to oil stains either on a hard surface, such as concrete or asphalt, or to oil spills on water. Use of an inert carrier with the amorphous silica makes the dry product of the present invention both oleophilic and hydrophilic. This allows the dry product of the present invention to be uniquely (a) self-acting, (b) highly efficient and (c) totally contain the bound absorbates (e.g., oil). While some inert carriers used in dry product embodiments of the present invention may absorb some oil, the amorphous silica combines with that oil in a matrix to prevent leaching until the oil is eventually bio-remediated in a natural way (e.g., at the disposal site).

These and other novel advantages and features of the present invention will be appreciated and understood from consideration of the following detailed description of preferred and varied forms of the concept.

DETAILED DESCRIPTION OF THE INVENTION

The oil and oil stain removal products of the present embodiments consist of optimal proportions by weight of untreated amorphous silica, which is the self-acting absorber/binder, combined with a suitable inert carrier.

Amorphous silica is also known as fumed silica, fumed silicon dioxide, colloidal silica, synthetic silica, colloidal silicon dioxide and pyrogenic amorphous silica. In powder form, this type of silica is fine, white, extremely fluffy and dusty, making it very difficult to apply and use as a powder by itself, especially in open air applications. In most commercial use, amorphous silica is incorporated into liquid products for rheology control, texture or to reinforce polymers and elastomers. Since amorphous silica can be used as an FDA approved additive in powdered food products, it is not toxic.

Untreated synthetic amorphous silica can be produced by the vapor phase hydrolysis of silicon tetrachloride in a hydrogen-oxygen flame. The combustion process creates silicon dioxide molecules, which condense to form particles. The particles collide, attach and sinter together. The result of these processes is a three dimensional, branched chain aggregate with a length of approx. 0.2-0.3 microns. As these cool, further collisions result in mechanical entanglement of the chains, termed agglomeration. The ultimate agglomerate size is less than 325 U S mesh (44 microns). This silica is amorphous in structure as opposed to crystalline. Therefore, it does not have the serious health problems associated with crystalline silica dust.

Another form of amorphous silica is precipitated silica. Precipitated silicas are synthesized by acidifying sodium silicate. The precipitated silicas distinguish themselves from silica gels on the basis of pore structure. Precipitates typically have a broad meso/macro pore structure, whereas gels have a more narrow microporous or mesoporous structure. While all untreated amorphous silicas comprise preferred embodiments, fumed silica is especially preferred. Among other worldwide suppliers of amorphous silica are Cabot Corp., Tuscola, Ill. (under the tradenames CAB-O-SIL® and EH-5) and W. R. Grace, Conn.

The amorphous silica component of the present invention is impractical to apply to oil spills and stains as a stand alone composition. Its low density, dusty fluffiness makes powdered amorphous silica very difficult to control. Moreover, the dust can irritate the respiratory tract, eyes and can cause dry, cracked skin.

In the present invention, one or more inert carriers are combined with the amorphous silica to provide specific area application control, eliminate dusting and un-agglomerating powder fluff balls. Surprisingly, the use of inert carriers greatly enhances absorption results, probably by the carrier spacing individual silica particles. The inventor has found acceptable results where amorphous silica comprises between 0.2% to 35% of the dry product weight. Through routine experimentation, those of skill in the art can obtain successful results with other proportions of amorphous silica to inert carrier, depending upon the inert carrier selected. Ideally, in forming the dry product mixture, one of skill in the art wants to optimize through routine experimentation three factors: (1) absorption, (2) binding, and (3) acceptable non-dusting.

A number of different inert carriers can be combined with amorphous silica to form the dry, oil absorbing product of the present invention. All of the suitable carriers of the present invention are "inert" in the sense that they are passive and chemically non-reactive (i.e., not readily reactive with other elements or compounds). Suitable inert carriers for the present invention include, but are not limited to, (a) inert, natural, inorganic carriers including, but not limited to, clays (e.g., kaolin type clay and Fuller's clay—Attasorb 30/60 RVM attapulgite, BASF Corp., Quincy, Fla.), perlite, vermiculite, crushed glass, volcanic ash and sand (RMC Pacific Materials, Pleasanton, Calif. kiln dried Monterey sand, 30 mesh "Lapis Lustre"); (b) inert organic carriers, including, but not limited to, peat moss, straw, hay, sawdust, ground corncobs, flours, and coconut coir; (c) inert synthetic carriers, including, but not limited to, polyurethane, polyethylene and polypropylene. These carriers may be combined with the amorphous silica individually or in various combinations. Moreover, these carriers may or may not act as granular sorbents since their main function is as carrier for the silica.

For oil stain removal from surfaces, the selection of carrier can be chosen with regard to protecting the surface from damage. For hard surfaces like concrete, concrete pavers and asphalt (roads), sand is a good choice for an inert carrier. Application can be by shaker container or broom spread. Sweeping up residue from this type of dry product will not harm the surface. For fine stone flooring, counter tops, furniture, trivets and the like, a soft, non-abrasive clay carrier is more appropriate.

The embodiments of the present invention include, but are not limited to, all those materials mentioned as inert carriers. A person skilled in the art can select combinations that fit oil stain and spill remediation according to needs.

A first application of the dry product of the present invention is for a hard surface. In this application, dry, granular product of the present invention is sprinkled onto or spread onto the oil contaminated hard surface, such as concrete pad, pavers, roads and asphalt surfaces. The active ingredient, synthetic amorphous silica, in a most startling, self-acting, vigorous manner absorbs the oil contaminant like (in an analogy) iron filings are drawn to a magnet. The self-acting absorption begins within seconds upon a liquid spill and may take minutes or several hours to complete depending on the severity of a stain. In addition to road surfaces, such as concrete or asphalt, the dry products of the present invention can also be applied to household surfaces, such as wood floors, wood furniture, plastic furniture, carpeting, cutting boards and granite countertops.

The term oil refers to the group comprising crude oil, tar oil, bunker oil, lubricating oil, lubricating grease, mineral oil, petroleum, hydraulic oil, paraffin oil, spindle oil, light and heavy fuel oil, diesel oil, kerosene, gasoline, benzene, oil carried liquid organic pesticides, vegetable oils and fats, animal oils and fats, and emulsions of the said products.

Another application of the dry product of the present invention is through dispersal onto the surface of oil floating on and contaminating water wherein the carrier containing the amorphous silica can float on the oil/water interface, or the carrier can be dense enough to sink, depending on the contaminant recovery system one chooses prior to remediation/decontamination. In the case of a floating carrier, the amorphous silica, within seconds, absorbs the oil film onto both itself and the carrier to create a bound, agglomerated matrix, easily becoming collectable and ready for remediation. In the case of a dense, heavier than water carrier, the oil is immediately absorbed by the amorphous silica that has coated the carrier's surfaces and the agglomerate sinks to the bottom of water for recovery and disposal. Once absorption is completed, the residue is easily swept up, or in the case of oil on water, the bound mass is easily collected by common means used to collect oil spills such as skimmers. For oil spills on water, the EPA outlines mechanical containment or recovery as the primary line of defense against oil spills in the U.S. The present invention can dramatically aid timely and more efficient containment and recovery.

In order to further illustrate the present invention and its advantages, the following specific examples are given, it being understood that such examples are intended only as illustrative and not limitative.

Example 1

Dry products of the present invention containing untreated synthetic amorphous silica/carrier admix and controls were sprinkled (approx. ¼ inch) onto uniform (approx. 5 inch diameter) spots of oil stain on concrete pavers. The oil stains were caused by leaking motor oil from a truck engine. After several hours the residue was swept off the stain and collected. Observation documented the following results;

|     | Product | Result |
| --- | --- | --- |
| (a) | 30 mesh sand | no effect, stain remained |
| (b) | 2.2% Cabot EH-5 silica admix in sand | stain completely disappeared |
| (c) | BASF 30/60 grade Attasorb ® RVM clay | lightened stain, stain remained |
| (d) | 4% Cabot M-5 silica admix in 30/60 Attasorb ® | stain completely disappeared |
| (e) | Home depot sawdust | no effect, stain remained |
| (f) | 8% Cabot EH-5 silica admix in sawdust | stain completely disappeared |

Example 2

The Example 1 tests were repeated on asphalt with products (a) and (b). The result was excellent stain removal performance of (b). The stain disappeared on this difficult surface vs. no effect of the control (a) where the stain remained.

Example 3

250 ml. of water was placed into a 400 ml. beaker. 10 gr. of Valvoline® SAE 30 motor oil was placed onto the water surface to represent an oil spill. Dry products of the present invention and controls were sprinkled onto the floating oil to determine the quantity of product necessary to absorb the oil and the resultant nature of the absorbate for recovery purposes.

| Product | Approximate amount by weight and percentage of product required to absorb all oil | Result |
| --- | --- | --- |
| Attasorb ® 30/60 | 15 gr., 150% | Absorbs oil, sinks, disperses, non-recoverable, leach able |
| 4% Cabot EH-5 silica admix in 30/60 Attasorb ® | 7 gr., 70% | Absorbs oil, floats as a compact matrix, more recoverable |
| Sawdust | 5 gr., 50% | Absorbs oil, floats, breaks up on surface (as reported by EPA) impeding recovery |
| 8% Cabot EH-5 silica admix in sawdust | 3 gr., 30% | Absorbs oil to a floating recoverable tight matrix. |

In the foregoing specifications, the invention has been described with reference to specific preferred embodiments and methods. It will, however, be evident to those skilled in the art that various modifications and changes may be made without departing from the broader spirit and scope of the invention as set forth in the appended claims.

What is claimed is:

1. A dry product consisting essentially of amorphous silica combined with a dry, inert granular carrier.

2. The dry product of claim 1 wherein said amorphous silica is between 0.2% and 35% by weight of said dry product.

3. The dry product of claim 1 wherein said carrier is an inert inorganic carrier.

4. The dry product of claim 3 wherein said inorganic carrier is selected from the group consisting of clays, including attapulgite clay, perlite, vermiculite, crushed glass, volcanic ash and sand.

5. The dry product of claim 1 wherein said carrier is an inert organic carrier.

6. A dry product consisting essentially of amorphous silica combined with a dry, inert carrier wherein said carrier is an inert organic carrier selected from the group consisting of peat moss, straw, hay, sawdust, ground corncobs, flours and coconut coir.

7. The dry product of claim 1 wherein said carrier is an inert synthetic carrier.

8. The dry product of claim 7 wherein said carrier is selected from the group consisting of polyurethane, polyethylene and polypropylene.

* * * * *